United States Patent [19]

Schmidt et al.

[11] Patent Number: 4,618,326

[45] Date of Patent: Oct. 21, 1986

[54] EQUIPMENT STAND FOR DENTAL IMPLEMENTS

[75] Inventors: Helmut Schmidt; Anton Bodenmiller, both of Leutkirch; Alfred Straka, Isny, all of Fed. Rep. of Germany

[73] Assignee: Kaltenbach & Voigt GmbH & Co., Biberach/Riss, Fed. Rep. of Germany

[21] Appl. No.: 733,121

[22] Filed: May 10, 1985

[30] Foreign Application Priority Data

Jun. 1, 1984 [DE] Fed. Rep. of Germany ....... 3420566

[51] Int. Cl.[4] ........................ A61G 1/14; A01C 15/00

[52] U.S. Cl. ........................................ 433/79

[58] Field of Search ...................... 433/49, 50, 51, 77, 433/78, 79

[56] References Cited

U.S. PATENT DOCUMENTS

| | | | |
|---|---|---|---|
| 553,572 | 1/1896 | Stafford | 433/32 |
| 1,400,028 | 12/1921 | Cohen | 433/50 |
| 4,026,026 | 5/1977 | Richardson | 433/77 |

*Primary Examiner*—Robert Peshock

[57] ABSTRACT

An equipment stand for dental implements, consisting of a support column mounting holders for the implements, wherein the holders are horizontally reciprocable; in effect moveable to and fro. The horizontally reciprocable holders facilitate that the mostly different kinds of implements which are positioned in the holder can be brought into a suitable nearness for gripping at the working location of the dental technician, and pursuant to need; for instance, for the creation of the free space which is necessary for carrying out any such work which is to be done without the above-mentioned implements, can be again moved away from proximity to the gripping location.

18 Claims, 7 Drawing Figures

EQUIPMENT STAND FOR DENTAL IMPLEMENTS

BACKGROUND OF THE INVENTION

1. Field of the Invention

The present invention relates to an equipment stand for dental implements, consisting of a support column mounting holders for the implements, wherein the holders are horizontally reciprocable; in effect moveable to and fro. The horizontally reciprocable holders facilitate that the mostly different kinds of implements which are positioned in the holder can be brought into a suitable nearness for gripping at the working location of the dental technician, and pursuant to need; for instance, for the creation of the free space which is necessary for carrying out any such work which is to be done without the above-mentioned implements, can be again moved away from proximity to the gripping location.

2. Discussion of the Prior Art

An equipment stand of the above-mentioned type is already known in the state of the art, as is illustrated by drawing FIG. 3 in German patent application No. P 33 39 656.6-35. In this equipment stand, which is representative of the state of the art, the holders are reciprocable or movable to and fro in conjunction with each other and with the support column. Consequently, when the dental technician requires one of a number of implements, provided therein, and he has moved the holder containing the necessary implement towards himself into proximity for gripping as a result of the above-mentioned common movability, collective other unneeded implements together with their holders and also the support column are in proximity for gripping. This produces a restriction of the working location and, consequently, a hindrance to the dental technician.

SUMMARY OF THE INVENTION

Accordingly, it is an object of the present invention to provide an equipment stand of the above-mentioned type in which there is avoided any hindrance to the dental technician after he has moved the holder containing the required implement towards himself into nearness for gripping; for instance, due to other holders.

The advantages which are achieved through the present invention can be essentially ascertained in that, because of the individual movability or displaceability of the holders, only the one holder containing the required implement can be brought into proximity for gripping, so as to avoid disturbances or hindrances to the dental technician which are caused by the other holders and by the support column.

BRIEF DESCRIPTION OF THE DRAWINGS

Further modifications and advantages of the invention may be readily ascertained in the following comprehensive description as set forth hereinbelow, as detailed by the various exemplary embodiments of the invention, taken in conjunction with the accompanying drawings; in which.

DETAILED DESCRIPTION

Figure 2:
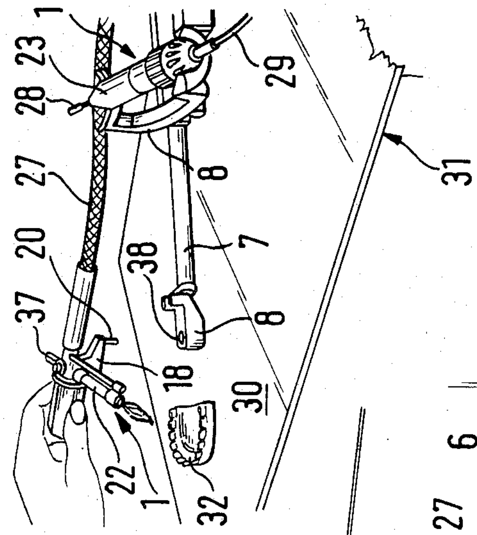
FIG. 2 illustrates a perspective view of the only the holders, the implement has been taken out from one of two holders.

The equipment stand consists of a support column 3 possessing two holders, which are generally identified by reference numeral 2 for dental implements 1. Instead of two holders, there can also be provided a greater number of holders 2 located besides, or superimposed above each other. The support column 3 extends in a vertical or essentially vertical direction. The two implements 1 which are located in the two holders 2 are, in the one case, constituted of a gas burner 22 with a flexible gas infeed hose 27, and in the other case, by a dental handpiece 23, for example, a grinding tool 28 with a flexible supply hose 29.

The implements 1 serve for the processing or finishing of dental workpieces, for example, a dental prosthesis 32 which is positioned on the tabletop 30 of a worktable 31, as shown in FIG. 2.

Figure 1:
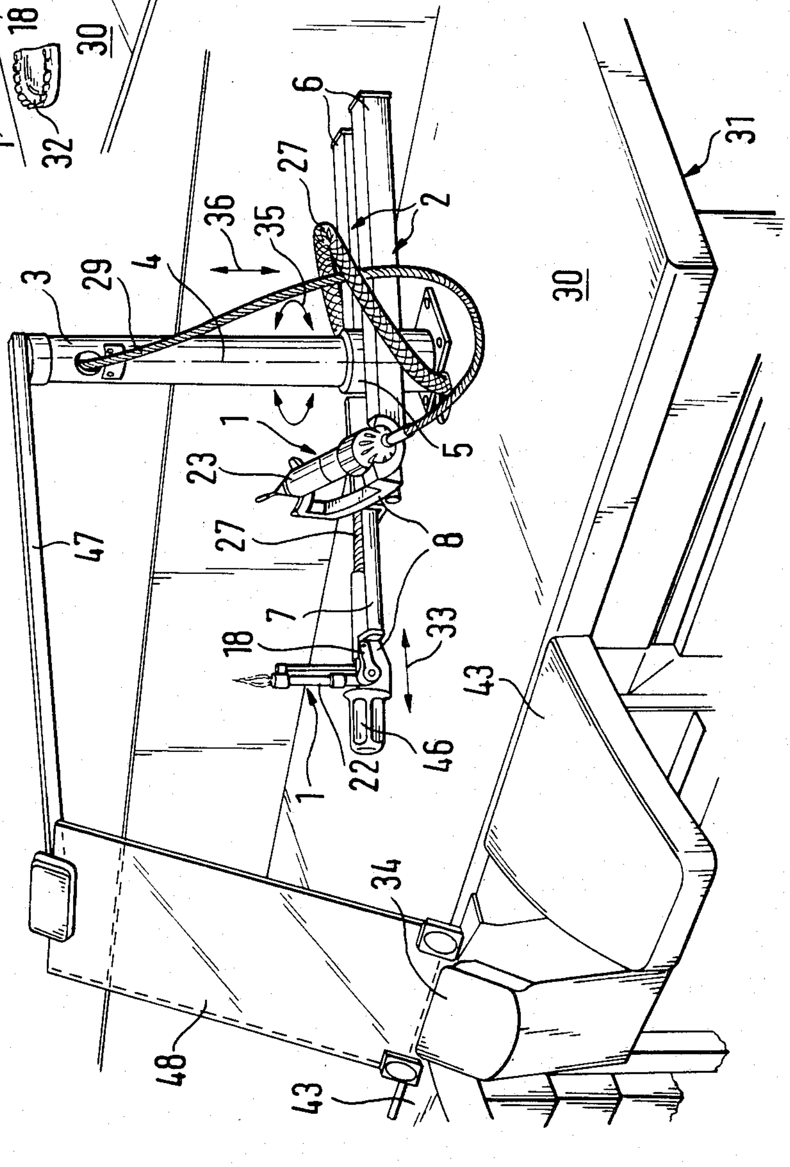
FIG. 1 illustrates a perspective view of an equipment stand with holders for dental implements which is arranged on a worktable.
Figure 6:
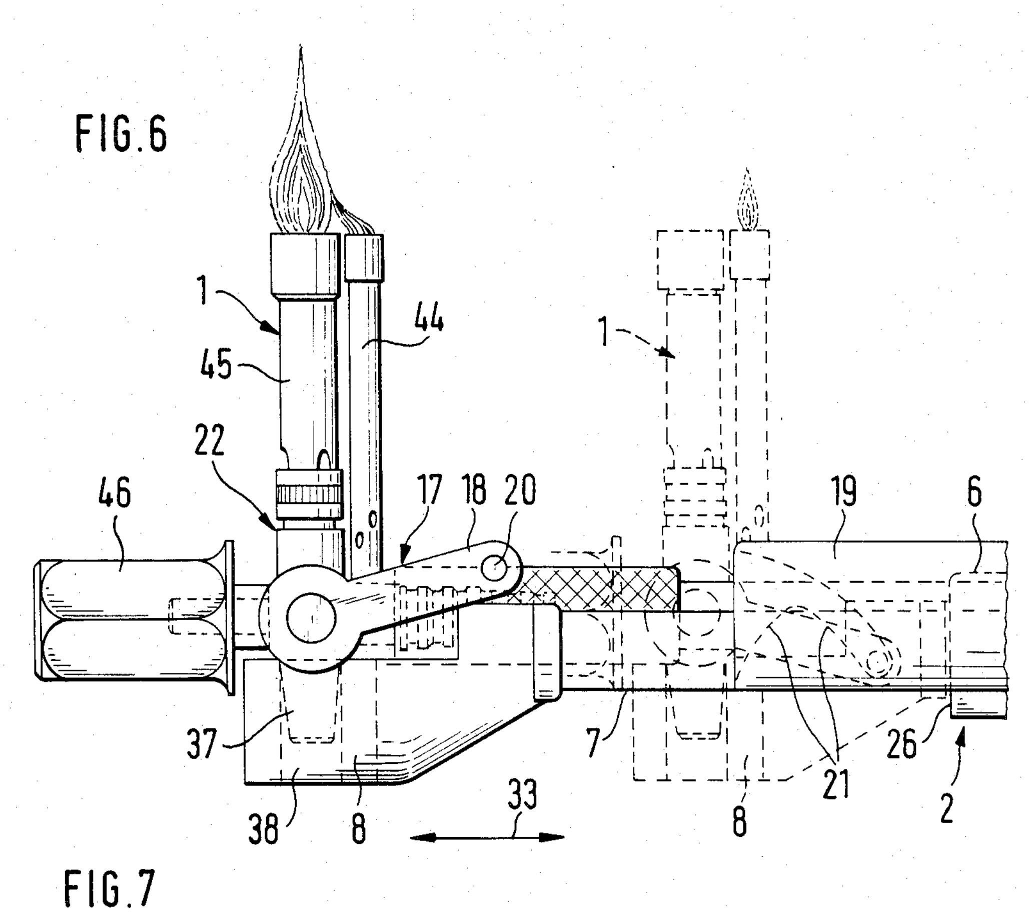
FIG. 6 illustrates a side view of an implement contained in the holder, wherein the solid lines represent a holder moved into one direction and the phantom lines illustrate the same holder moved in the opposite direction.
Figure 7:
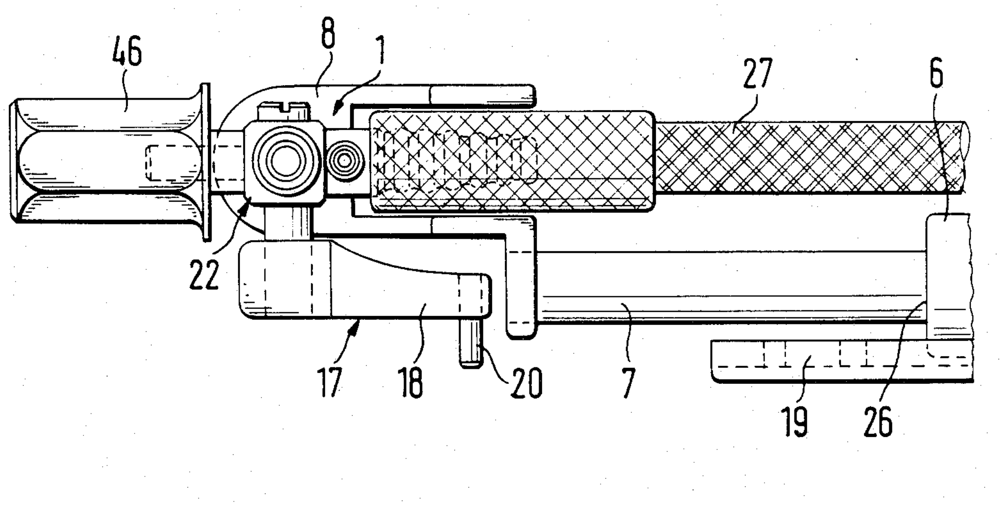
FIG. 7 illustrates a top plan view of the implement contained in the holder.

The holders 2 are each individually horizontally movable to and fro or reciprocable relative to the support column 3. Basically, the above-mentioned movement can be carried out along any suitable path; for example, a curved path of movement, wherein the holders can be pivotable. However, the holders 2 as is illustrated, can also be movable linearly in conformance with the horizontal double-headed arrow 33 shown in FIGS. 1 and 6. The holders 2 are pulled into the gripping region which is the proximity of a work block 34 as ascertainable from FIG. 1, and after completing the use of the applicable implement 1, again pushed away out of the gripping region. An arm rest 43 is arranged on each side of the work block 34. With the aid of a turning sleeve 5 which carries the holders 2 and which is pivotable about the support column 3, the holders 2 can be commonly rotated along the in the direction of the circular arrow 35, as shown in FIG. 1, about the longitudinal axis 4 of the support column 3. Achieved therewith it is still greater, degrees of movability for the holders 2.

For the further improvement of the movability, the holders 2 can be suitably adjusted in height together with the turning sleeve 5, pursuant to the double-headed arrow 36 as shown in FIG. 1.

The two holders 2, viewed from above relative to of the support column 3, are positioned diametrically opposite each other; in effect, the support column 3 is located intermediate the two holders 2.

The implements 1, for example as illustrated in FIG. 2 the gas burner 22, can be withdrawn from the holders 2, which evidently also applies to the dental handpiece 23.

The holders 2 each, respectively consist of a telescopic sleeve or tube 6 which is arranged on the support column 4 or on the turning sleeve 5, and a telescopic rod 7 which is extendable from within the telescopic tube 6;

in effect, which is supported so as to be movable back and forth; on the free end of which rod 7 there is arranged a pickup or receiver device 8 for the dental implement 1. In order to facilitate withdrawal of the implement 1, the receiver device 8 which receives the handpiece 23 is constructed as s kind of support cradle, and the receiver device 8 which receives the gas burner 22, particularly as can be ascertained from FIGS. 2 and 6, as a type of an insert opening 38 adapted to receive therein an insert projection 37 on the gas burner 22.

Figure 4:
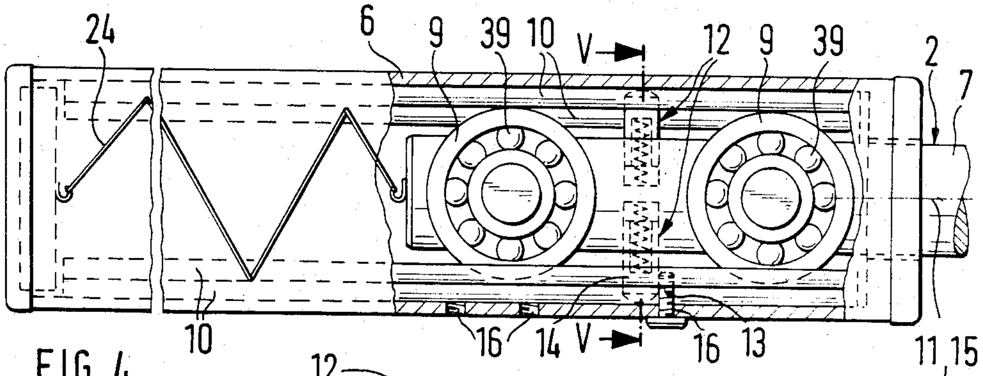
FIG. 4 illustrates longitudinal sectional view through a portion of a holder.
Figure 5:
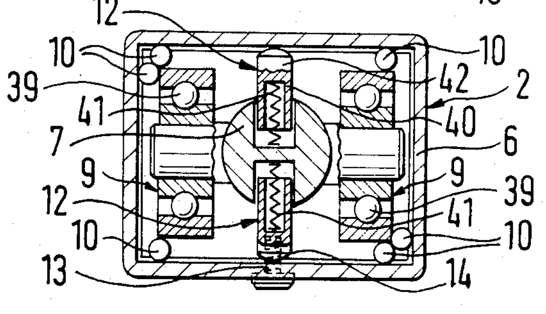
FIG. 5 illustrates a sectional view taken along line V—V in FIG. 4.

The telescopic rod 7 can be supported through sliding bushings, or as shown in FIGS. 4 and 5 by a kind of a carriage having four running rollers 9, in the telescopic tube 6. The running rollers 9 are equipped with ball bearings 39 and travel on rail-like guide tracks 10 which are arranged within the telescopic tube 6. The guide rails 10, which are constructed as rods which are circular in cross-section, are associated in a manner with the running rollers 9, as shown in FIG. 5, so as to prevent any tilting of the telescopic rod 7 about its longitudinal axis 11. For this purpose, as is shown in the cross-section pursuant to FIG. 5, there is provided at all four corners respectively one running track 10 which cooperates with the running surface of the running rollers 9, and the upper left as well as the lower right, there is also respectively provided a guide track 10 cooperating with the outer side surface of the running rollers 9.

In order to especially prevent the occurrence of any undesired to and fro movement of the telescopic rod 7, there is provided at least one brake 12 which restrains the extending movement and the retracting movement of the telescopic rod 7. In accordance with the embodiment of FIGS. 4 and 5 there are provided two brakes 12. The brake 12 consists of a breaking member 42 arranged within a radially extending blind bore 40 in the telescoping rod 7, which is pressed outwardly by a pressure spring 41, and which contacts against the inner wall of the telescopic tube 6.

In order to limit the extended length of the telescopic rod 7, there is provided a stop 13. Herein, the construction is such that the stop 13 is arranged on the telescopic tube 6 and the brake 12 on the telescopic rod 7, wherein the brake 12 is associated with the stop 13 as a counterstop 14, whereby the stop 13 is displaceable along the direction of the longitudinal axis 15 of the telescopic tube 6 on order to vary the maximum extended length of the telescopic rod 7, and the telescopic tube 6 incorporates a plurality of detents 16 for the insertion of the stop 13 in different positions.

In order, especially when the implements are not needed; in effect, when the receiver devices 8 are moved out of the gripping region, that there stands available to the dental technician the greatest possible open space, the configuration is such that the exit opening 25 for the end 26 of the telescopic tube 6 which has the telescopic rod 7 therein, is closely conformed with the basic plan of the support column 3 or only slightly projects beyond the above-mentioned basic plan or its cross-section.

As is illustrated in the drawing in representing the gas burner 22, a switching device 17 is associated with the holders 2, which will place the implement 1 located in the holder, and which is operable by a drive means, into a standby state or operation upon movement into the one direction, and upon movement into the other direction place it into an inactive or non-operating condition. The switching device 17 hereby acts in such a manner that, for example, in the case of the gas burner 22, the gas feed for the burner flame to the burner tube 45 located adjacent the burner tube 44 is activated for the operating flame, or in the case of an electrically-operated dental handpiece 23, the supply of current to the handpiece is switched on and there is met the preselection "Motor On" or "Motor Off".

The switching device 17 consists of a tilt lever 18 arranged on the implement 1, and a cam lever-like control element 19 which is fixed to the support column 3 and which is actuates the tilt lever of the implement in the holder 2 which is in motion. Hereby, the control element 19 can be, for example, fastened on the telescopic tube 6 or on the turning sleeve 5. The tilt lever 18 includes a laterally projecting guide pin 20, and the control element 19 incorporates control tracks or grooves 21 for the engagement of the guide pin 20.

When the implement 1, for instance, pursuant to FIG. 2 the gas burner 22, has been removed from the receiving device 8, the switching device 17, or in effect the tilt lever 18, can be actuated by hand. For better handling, the gas burner 22 is equipped with a handgrip 46. A drive 24 can be provided for effecting the movement of the holders 2 in at least the one direction. Pursuant to FIG. 4, there is provided a drive 24 in the form of a tension spring for effecting the movement of the telescopic rod 7 associated with the holder 2 into the inoperative position, in effect, into the telescopic tube 6. The drive 24 can be also formed by a motor.

Figure 3:
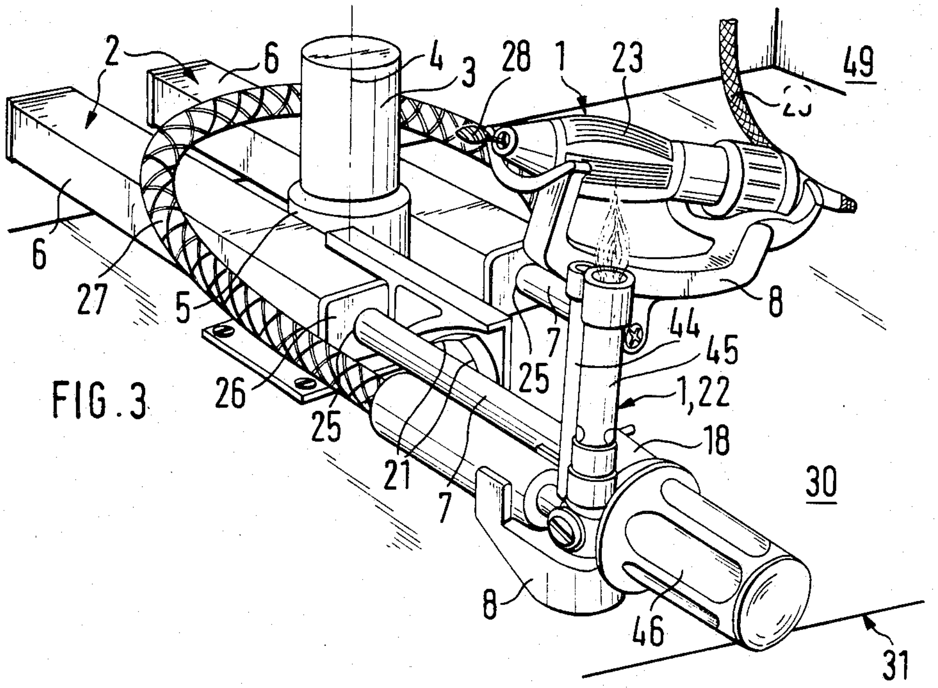
FIG. 3 illustrates a perspective view, on an enlarged scale, of the equipment stand.

Insofar as the support column 3, for example as in FIG. 1, has a sufficiently large height, there can be arranged on its upper end by means of an angled retaining collar arm 47, a protective plate 48 consisting of a transparent material, which lies with its lower edge against the work block 34. When no protective plate is provided, then a lower height of the support column 3 is also sufficient, as is illustrated in FIG. 3.

The support column 3, instead of being arranged, as in FIG. 1, on the tabletop 30 of a worktable 31, can also be supported in a manner not shown herein, by means of a collar or extension arm, for instance, from a room wall or from a rear side 49 of the worktable 31.

What is claimed is:

1. In an equipment stand for the deposition of dental implements during the non-use of said implements, a stationary support column; holders for said implements being mounted on said support column, said holders being linearly reciprocable in a horizontal plane relative to said support column and pivotable about the longitudinal axis of said support column, the improvement comprising: said holders being arranged on a turning sleeve which is rotatable about the support column, said holders being pairwise diametrically located opposite each other on said support column, and said holders with said turning sleeve are vertically adjustable in height.

2. An equipment stand as claimed in claim 1, wherein said implements are withdrawable from the holders.

3. An equipment stand as claimed in claim 1, wherein the holders each comprise a telescopic tube and a telescopic rod extendably supported in said telescopic tube; and receiver means for the dental implements being positioned on the free end of the telescopic rod.

4. An equipment stand as claimed in claim 3, wherein running rollers support the telescopic rod in said telescopic tube.

5. An equipment stand as claimed in claim 4, wherein guide roller tracks in the telescopic tube are associated with the running rollers.

6. An equipment stand as claimed in claim 5, wherein the guide roller tracks are operatively associated with the running rollers so as to inhibit tilting of the telescopic rod about the longitudinal axis thereof.

7. An equipment stand as claimed in claim 3, comprising at least one brake restraining the movement of extension of the telescopic rod.

8. An equipment stand as claimed in claim 7, comprising a stop for limiting the extended length of the telescopic rod.

9. An equipment stand as claimed in claim 8, wherein the stop is arranged on the telescopic tube and the brake is arranged on the telescopic rod, said brake being operatively associated with the stop to form a counter stop.

10. An equipment stand as claimed in claim 8, wherein the stop is displaceable along the direction of the longitudinal axis of the telescopic tube for varying the maximum extended length of said telescopic rod.

11. An equipment stand as claimed in claim 10, wherein the telescopic tube includes a plurality of detents for engaging the stop in different positions thereof.

12. An equipment stand as claimed in claim 3, wherein the outlet opening in the end of the telescopic tube receiving the telescopic rod has a substantially close conformance with the cross-sectional configuration of the support column or projects only slightly beyond the cross-sectional configuration.

13. An equipment stand as claimed in claim 1, wherein switching means is operatively associated with at least one of the holders for actuating drive means for placing the instrument into a state of preparedness or into operation upon movement in one direction, and during movement in the other direction placing it into an inactive or inoperative condition.

14. An equipment stand as claimed in claim 13, wherein said switching means includes a tilt lever supported on the implement and a control element fastened to the support column for setting the tilt lever of the implement in the holder into motion.

15. An equipment stand as claimed in claim 14, wherein the tilt lever includes a laterally projecting guide pin, and said control element includes control tracks or grooves engageable by said guide pin.

16. An equipment stand as claimed in claim 1, wherein the implement comprises a gas burner.

17. An equipment stand as claimed in claim 1, wherein the implement comprises a dental handpiece.

18. An equipment stand as claimed in claim 1, including a drive for effecting movement of the holders in at least one direction.

* * * * *